April 26, 1949.
A. M. PEEPLES
2,468,376
RAKE WITH REMOVABLE TINE
Filed Aug. 15, 1946
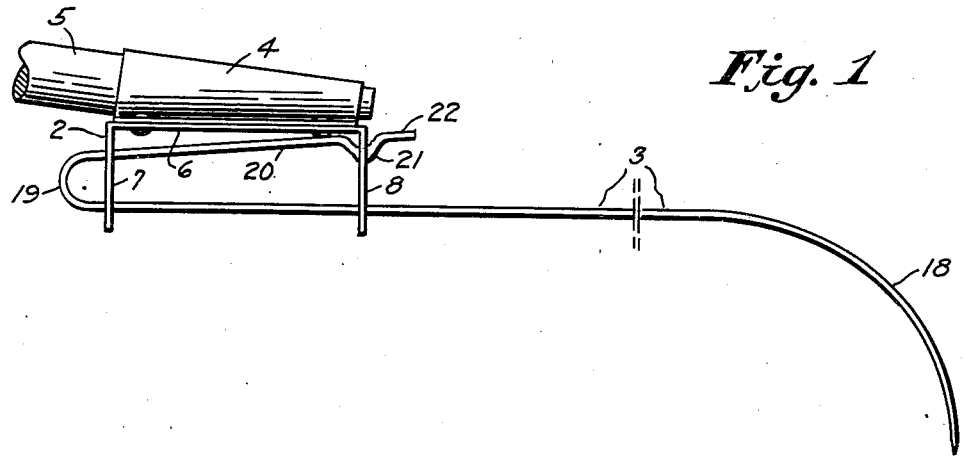
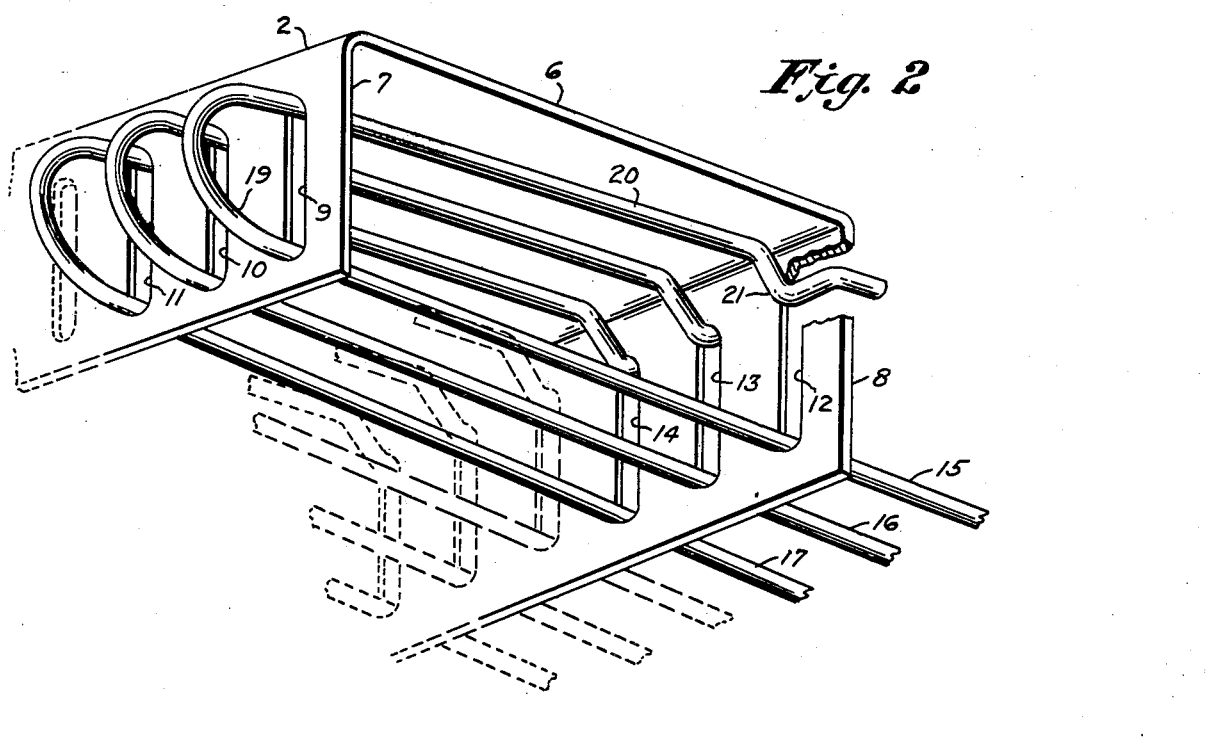
Aldrich M. Peeples
Inventor
by
Attorney Patented Apr. 26, 1949

2,468,376

UNITED STATES PATENT OFFICE 2,468,376

RAKE WITH REMOVABLE TINE

Aldrich M. Peeples, Jacksonville, Fla., assignor, by mesne assignments, to Henry H. Hull, Jacksonville, Fla.

Application August 15, 1946, Serial No. 690,725

3 Claims. (Cl. 56—400.21)

This invention relates to rakes and more particularly to those having removable spring tensioned tines, having for its object to provide a construction which is simple in parts, more effective in use, and less costly to manufacture than those heretofore proposed.

With these and other objects in view the invention resides in the novel details of construction and combinations of parts as will be disclosed more fully hereinafter and particularly pointed out in the claims.

Referring to the accompanying drawings forming a part of this specification and in which like numerals designate like parts in all the views, Fig. 1 is a side elevational view of a rake embodying the principles of this invention; and Fig. 2 is a partial perspective view of one end of the rake crosshead, particularly illustrating the manner of inserting and locking a tine therein.

According to this invention the rake comprises a crosshead generally identified by the numeral 2 into which a plurality of resilient tines 3 are springingly inserted and locked under tension therein, with a ferrule 4 secured to said crosshead and adapted to receive the end of the handle 5.

The crosshead comprises a metallic member of channel formation or cross-section, having a web portion 6 which is imperforate insofar as respecting any tine, and two substantially parallelly disposed flanges 7 and 8. Each flange is provided with a series of apertures for receiving therethrough a portion of a tine, the apertures of one flange being substantially duplicated (as to dimensions and position) in the other flange, so that when the tines are positioned in the crosshead as shown in Fig. 2 they will be substantially parallel to each other. It is to be understood, however, that instead of the specific parallel arrangement the tines may be so mounted in the crosshead as to result in a fan-shape formation.

Each aperture is an elongated slot, the slots 9, 10, 11, etc. of flange 7 being correspondingly or complementally positioned therein with respect to the elongated slots 12, 13, 14, etc. of flange 8, the pair of slots 9 and 12 receiving the specific tine 15, the pair of slots 10 and 13 receiving the specific tine 16, the pair of slots 11 and 14 receiving the specific tine 17, etc. The elongation of each slot is in a direction substantially perpendicular to the plane of the web 6 of the crosshead, and the width of each slot is equal substantially to the cross-sectional dimension of the tine to be received therein, to the end that all of the tines may snugly fit their respective apertures.

Each tine, as best illustrated in Fig. 1, comprises a metallic member which may be of circular or other cross-section, the material of the tine being of sufficient hardness and resiliency to serve adequately in the rake, i. e. possessing sufficient inherent springiness for the ground-engaging portion 18 to flex in the use of the rake and to return to its normal when not in use. This inherent springiness is further instrumental in the locking of a tine in its pair of slots in the cross-head as will be presently described.

Each tine is bent to provide a hook or loop portion 19 joining the short locking arm 20 with the longer ground-engaging arm, the length of the short arm being greater than the distance between the spaced parallel flanges 7 and 8 of the crosshead, and this short arm, in the manufacture of the tine, is made to lie in the plane of the longer arm, the two arms normally having a slight angularity therebetween, which angularity is divergent in the direction away from said loop portion. Adjacent the extreme end of the short arm 20, there is provided a formation which complementally coacts with the slot formation to provide an interlocking relation between the tine and the cross-head, and in the drawings one example of such interlocking is illustrated as comprising a lateral notch or bend 21, of substantially V-shape formation, which lies in the plane common to both arms, said bend extending in the direction toward the longer arm.

The result of this construction permits the rounded smooth loop portion 19 of tine 15 to be inserted quickly and without difficulty first through the elongated slot 12 of flange 8, and then through the elongated slot 9 of flange 7, to bring the hollowed, recessed, indented, open, or concave area formation of the tine as illustrated by the V-shaped bend or notch 21 into locking engagement with the extreme upper end or complementally formed edge portion of elongated slot 12, the short arm 20 of said tine yielding (due to its inherent springiness with respect to the loop 19) to bring about the coengagement of said notch and said slot. Thereafter, said short arm is maintained in such locked coengagement under spring tension, the exertion of this spring tension being in a direction away from the longer arm of the tine.

Should the tine become broken or, for other cause, require removal from the crosshead, the extreme end 22 of the short arm may be forced downwardly, or in a direction toward the longer arm, to disengage notch 21 with slot 12, whereupon the tine may be withdrawn from the crosshead. Thus it will be seen that, in the use of the rake, the ground-engaging longer arm as usual is flexed upwardly as seen in Fig. 1, and this serves to increase the spring tension existing relatively between the two arms, and hence has the tendency to maintain more forcibly the locked engagement of notch and slot.

It is obvious that those skilled in the art may vary the details of construction and arrangements of parts without departing from the spirit of this invention and therefore it is desired not to be limited to the exact foregoing disclosure except as may be required by the claims.

What is claimed is:

1. A rake comprising a handle, a plate secured to the handle and provided with oppositely disposed downwardly extending flanges, each flange having a series of elongated slots therein, each slot extending in a direction substantially at right angles to said plate, the slots of one flange in substantial alignment with the slots of the other flange, and a plurality of tines each formed of a single piece of resilient material having an end reversely extended to form a loop providing angularly disposed arms, one arm being longer than the other and constituting the ground-engaging portion of the tine, the looped portion of the tine extending through a pair of aligned slots in said flanges, the shorter tine arm provided adjacent its free end with a formation in complemental engagement with the end wall of a slot for retaining the tine under spring tension.

2. A rake head comprising a plate provided with oppositely disposed downwardly extending flanges, each flange having a series of elongated slots therein, each slot extending in a direction substantially at right angles to said plate, the slots of one flange in substantial alignment with the slots of the other flange, and a plurality of tines each formed of a single piece of resilient material having one end reversely extended to form a loop providing angularly disposed arms, one arm being longer than the other and constituting the ground-engaging portion of the tine, the looped portion of the tine extending through a pair of aligned slots in said flanges, the shorter tine arm provided adjacent its free end with a formation in complemental engagement with the end wall of a slot for retaining the tine under spring tension.

3. A rake head comprising a plate provided with oppositely disposed downwardly extending flanges, each flange having a series of elongated slots therein, each slot extending in a direction substantially at right angles to said plate, the slots of one flange being a substantial duplicate of, and in substantial alignment with, the slots of the other flange whereby to establish a plurality of pairs of opposed slots spaced lengthwise of said flanges, and a plurality of tines each formed of a single piece of resilient material having one end reversely extended to form a loop providing angularly disposed arms, one arm being longer than the other and constituting the ground-engaging portion of the tine, the looped portion of the tine extending through a pair of aligned elongated slots in said flanges with both tine arms in contact with the extremities of each slot of the pair of slots, the shorter tine arm provided adjacent its free end with a formation in complemental engagement with the end wall of a slot for retaining the tine under spring tension.

ALDRICH M. PEEPLES.

REFERENCES CITED

The following references are of record in the file of this patent:

UNITED STATES PATENTS

| Number | Name | Date |
|---|---|---|
| 1,735,237 | Dennis | Nov. 12, 1929 |
| 1,784,947 | Rocquin | Dec. 16, 1930 |
| 1,813,445 | Dowd | July 7, 1931 |
| 1,925,357 | Withington | Sept. 5, 1933 |
| 1,942,629 | Withington | Jan. 9, 1934 |